United States Patent
Courtemanche et al.

(10) Patent No.: US 8,544,383 B2
(45) Date of Patent: Oct. 1, 2013

(54) LIQUID SEPARATION DEVICE

(75) Inventors: Alain Courtemanche, Lefebvre (CA);
Yann Desrochers, St-Nicephore (CA);
Jerome Brisson, Drummondville (CA);
Stephane St-Onge, St-Nicephore (CA)

(73) Assignee: GEA Farm Technologies Canada Inc., Quebec (CA)

( * ) Notice: Subject to any disclaimer, the term of this patent is extended or adjusted under 35 U.S.C. 154(b) by 0 days.

(21) Appl. No.: 13/054,301

(22) PCT Filed: Sep. 14, 2010

(86) PCT No.: PCT/CA2010/001425
§ 371 (c)(1),
(2), (4) Date: Sep. 16, 2011

(87) PCT Pub. No.: WO2011/029200
PCT Pub. Date: Mar. 17, 2011

(65) Prior Publication Data
US 2012/0031856 A1    Feb. 9, 2012

(30) Foreign Application Priority Data
Sep. 14, 2009 (CA) ..................................... 2678834

(51) Int. Cl.
*B30B 9/02* (2006.01)
*B30B 9/22* (2006.01)

(52) U.S. Cl.
USPC ............. 100/110; 100/37; 100/114; 100/116; 100/118; 100/127

(58) Field of Classification Search
USPC ................... 100/37, 110, 114, 116, 118, 126, 100/127
See application file for complete search history.

(56) References Cited

U.S. PATENT DOCUMENTS

| 233,779 | A | * | 10/1880 | Luff .................................. 254/32 |
| 2,846,944 | A | * | 8/1958 | Willmes et al. ............... 100/153 |
| 3,928,105 | A | | 12/1975 | Holden |
| 4,475,453 | A | * | 10/1984 | Davis ............................ 100/118 |
| 4,589,923 | A | * | 5/1986 | Gruenewald ...................... 127/4 |
| 4,872,404 | A | * | 10/1989 | Quetsch et al. ............... 100/125 |
| 5,128,030 | A | | 7/1992 | Hautala |
| 5,268,187 | A | * | 12/1993 | Quinlan ........................ 426/496 |
| 5,945,036 | A | * | 8/1999 | Reitz ............................ 252/572 |
| 6,221,265 | B1 | * | 4/2001 | Hoden .......................... 210/770 |
| 7,381,329 | B1 | * | 6/2008 | Moss ............................ 210/255 |
| 2004/0144265 | A1 | * | 7/2004 | MacKie ........................ 100/169 |
| 2004/0262130 | A1 | * | 12/2004 | Brown et al. ............ 198/781.05 |
| 2008/0041245 | A1 | * | 2/2008 | Judocus ........................ 100/118 |

* cited by examiner

*Primary Examiner* — Dana Ross
*Assistant Examiner* — Onekki Jolly
(74) *Attorney, Agent, or Firm* — McDermott Will & Emery LLP (57) ABSTRACT

A liquid separating device (1) for processing a mixture material (3) containing both solid and liquid materials (3a,3b), in order to separate liquid material (3b) from the solid material (3a), the liquid separating device (1) includes a support frame (5), a series of liquid separation assemblies (7a,7b) and a corresponding guiding assembly (19) between each pair of liquid separation assemblies (7). The liquid separation assemblies (7) are disposed about the support frame (5) in a cascading configuration, and the passage (13) of each liquid separation assembly (7) is narrower in width than the passage of a preceding liquid separation assembly (7) so that each subsequent liquid separation assembly (7b) is enabled to extract more liquid material via an increased wringing pressure resulting from a thickening of the remaining mixture material (3) to be processed and the narrower subsequent passage (13b) through which it is channeled and pressed.

23 Claims, 6 Drawing Sheets

LIQUID SEPARATION DEVICE

RELATED APPLICATIONS

This application is the U.S. National Phase under 35 U.S.C. §371 of International Application No. PCT/CA2010/001425, filed on Sept. 14, 2010, which in turn claims the benefit of Canadian Application No. 2,678,834, filed on Sept. 14, 2009, the disclosures of which Applications are incorporated by reference herein.

FIELD OF THE INVENTION

The present invention relates to a liquid separating device. More particularly, the present invention concerns a liquid separating device for processing a mixture material containing both solid and liquid materials, in order to separate liquid material from the solid material, and also relates to a kit for assembling the same, as well as to corresponding methods of operation and/or of assembly associated thereto.

BACKGROUND OF THE INVENTION

Liquid separating devices (or simply "separators"), such as manure separators for example, and the cascading press roller configurations used therewith, are known in the art, as shown in FIGS. 1-4, for example.

Also known to the Applicant are the following US patent and patent applications which describe various other types of conventional separating mechanisms and/or roller assemblies: U.S. Pat. Nos. 1,339,600; 3,531,404; 3,699,881; 3,873,450; 3,906,853; 3,971,310; 4,070,175; 4,775,472; 4,879,034; 4,940,500; 4,986,910; 4,997,579; 5,022,989; 5,073,200; 5,268,100; 5,545,333; 6,003,684; 7,314,141 B1; 7,381,329 B1; 7,651,619 B2; 2001/0046456 A1; 2005/0279711 A1; 2007/0193063 A1; and 2010/0032384 A1.

It is also known that a substantial problem associated with conventional liquid separating systems is that remoistening is very present when carrying out liquid separation ("dewatering") by compression under rollers. Indeed, material is fed between rollers, the solid exiting between the rollers and the liquid going into the rollers. The phenomenon of surface tension in the liquids causes the liquid extracted and going through the porosities of the roller to not be entirely extracted since an amount of water remains within the porosities. When the matter exits from between two rollers, these droplets captured in the porosities of the roller return into the material to be processed, which is not desirable.

Another substantial problem associated with conventional liquid separating systems is that the extracting of liquid is also influenced by the pressure applied to the matter to be processed. Since the matter enters in a random fashion, it often occurs that certain areas of the bed have less matter, and therefore practically no compression pressure is available while it is distributed on the environing matter.

There is thus a need in the art to improve the drying rate of the fibre ("separation rate") being possible, and to also limit the "remoistening" of the fibre with is common to most conventional systems.

It should be noted also that the treatment equipment must generate an acceptable drawing rate for use on extracted solids as litter. The use of a solid as litter may be considered when the proportion of dry matter is greater than 29%. The current conventional technologies of "screw press" type succeed in obtaining drying rates in this order, however their mechanical configuration damages the fibre which constitutes the solid matter. The behaviour of the bacteria in the litter and the comfort of the animals is thus compromised. It should be noted also that the behaviour of the matter to be processed is not linear. As a consequence, it is much easier to go from a rate of 29 to 32%, then it is to go from a rate of 31 to 34% of dry matter. For each additional percentage of separation, the effort required for the treatment increases exponentially.

Tests have demonstrated that it is possible, with conventional systems of the prior art, to obtain a rate of solid matter in the order of about 31% (more particularly with roller press) to about 35% (particularly with "screw press" type configurations). However, further to undesirable properties of the extracted matter (type of fibre and chemical composition), the results have shown not to be constant and a lot of mechanical failures and/or premature wear was present, given strong compression forces necessary. It is thus not viable, by using the conventional systems of the prior art, to efficiently use the solid portion extracted as litter. Cultivators and breeders are thus constrained to use other solutions in order to ensure the comfort of animals.

Another important consideration rests on the application of the product on the market. A viable solution must thus be low cost and offer the possibility of treating the matter of small farms while allowing the possibility of expansion thereof. The efficiency rates described hereinabove relate to the manure treatment of bovine breeding. It should be considered that the above-mentioned drawbacks of the prior art are also present in different environments of separation, such as in the food industry, the separation of municipal waste, specialised treatment plans, etc.

Roller separators are also well known in the art. Indeed, in the farming field for example, in order to extract water away from material to be treated, such as manure for example, the material is often inserted into a series of rollers that press water out of the material. However, the rollers are generally equal in length, from one stage to another, and the thickness of the material being treated or "pressed" is always the same from one stage to another, which not only does not allow to efficiently extract water from the material, but can sometimes lead to a reabsorbing effect (water may be absorbed back into the material), which is obviously undesirable, as aforementioned.

Hence, in light of the above-discussed, there is a need for an improved liquid separating device, which by virtue of its design and components, would be able to overcome or at the very least minimize some of the above-mentioned prior art problems and drawbacks.

SUMMARY OF THE INVENTION

An object of the present invention is to provide a liquid separating device (hereinafter referred to also simply as "separator") which satisfies some of the above-mentioned needs, and which is thus an improvement over other related devices and/or corresponding liquid separating methods known in the prior art.

In accordance with the present invention, the above object is achieved, as will be easily understood, with a liquid separating device such as the one briefly described herein and such as the one exemplified in the accompanying drawings.

More particularly, according to the present invention, there is provided a liquid separating device for processing a mixture material containing both solid and liquid materials, in order to separate liquid material from the solid material, the liquid separating device comprising:

a support frame;

a first liquid separation assembly mounted on the support frame, the first liquid separating assembly comprising an upper wringing component and a lower draining component, said components being positioned with respect to another so as to define a first passage therebetween through which the mixture material to be processed is channeled and pressed, in order to extract liquid material therefrom, the first passage having an inlet for receiving the mixture material to be processed and an outlet for releasing processed material;

at least one subsequent liquid separation assembly mounted on the support frame, each subsequent liquid separating assembly also comprising an upper wringing component and a lower draining component, said components being positioned with respect to another so as to define a subsequent passage through which remaining mixture material to be processed is further channeled and pressed, in order to further extract liquid material therefrom, the subsequent passage having an inlet for receiving material processed by a preceding liquid separation assembly and an outlet for releasing further processed material; and at least one guiding assembly mounted on the support frame and operatively disposed between each liquid separation assembly for urging mixture material released from a given liquid separation assembly towards a subsequent liquid separation assembly so as to increase the effective thickness of the released mixture material prior to entering the subsequent liquid separation assembly;

wherein the liquid separation assemblies are disposed about the support frame in a cascading configuration, and wherein the passage of each liquid separation assembly is narrower in width than the passage of a preceding liquid separation assembly so that each subsequent liquid separation assembly is enabled to extract more liquid material via an increased wringing pressure resulting from a thickening of the remaining mixture material to processed and the narrower subsequent passage through which it is channeled and pressed.

According to another aspect of the present invention, there is also provided a separating apparatus for separating solid and fluid matters from a wet mixture, comprising:

at least two pressing stages in a cascade, each pressing stage comprising:
an inlet for receiving said wet mixture; and
a pressing component and a perforated component defining therebetween a passage through which the wet mixture from the inlet is channelled and pressed to extract at least part of the fluid matter therefrom through the perforated component, the passage having a width across a direction of the channelling of the wet mixture, the widths of the passages of consecutive pressing stages being increasingly narrower along said cascade;
a guide disposed between each consecutive ones of said pressing stages for guiding the solid matter and remaining liquid matter of the wet mixture therebetween.

According to an aspect of the present invention, there is provided a separator for treating matter composed of solid and liquid elements, the separator comprising:
a) a support;
b) a first section having and inlet for receiving the matter to be treated, and an outlet for releasing the treated matter, the first section comprising a passage having a given width and a given height across which the matter to be treated is channelled for pressing against a perforated component for letting the liquid elements go through the perforated component and for guiding the remaining elements to another section; and
c) a second section having an inlet for receiving the matter with the remaining elements of the first section to be treated, and an outlet for releasing the matter to be treated, the second section comprising a passage of a given width and a given height across which the remaining elements pass for pressing against a perforated component for letting the liquid elements go through the perforated component and for guiding the solid elements toward another section, the width of the passage of the second section being narrower than the width of the passage of the first section.

Among other objectives, the present invention seeks to improve the drying rate or level in order to separate the liquid portion of matter from the solid portion and to reuse the latter for providing biological litter, for example, to be used for animals, and further to provide a better control of the drying rate for the production of components from fecal residue present in establishments such as a bovine farm, or the like.

An important advantage resulting from the present invention resides in that the narrowing from one section to the next increases the thickness of the matter to be treated, and also reduces the re-absorption of the liquid elements.

Preferably, the separator comprises a third section, each section being cascading one with respect to the other. Preferably also, the pressing in one section is made between a first non-perforated roller and a second perforated roller for liquid separation, the second roller being placed beneath the first roller.

Preferably also, the separator is provided with a driving system (motor, etc.) cooperating between the rollers for pivotally driving said rollers about the support.

The separator is preferably provided with a recipient for recuperating the liquid disposed underneath each perforated separation roller.

According to another aspect of the present invention, there is provided a method of processing a mixture material containing both solid and liquid materials, in order to separate liquid material from the solid material, the method comprising the steps of:
a) pressing the mixture material through a first given passage and extracting liquid material therefrom via a draining component in a first stage; and
b) funneling remaining mixture material released from the first stage in order to have an increased effective thickness of the remaining mixture material and pressing the thickened remaining mixture material through a subsequent passage narrower than the preceding one so as to further extract liquid material therefrom via another draining component in at least one other stage.

According to a preferred embodiment of the invention, the method could simply consist of a) providing a liquid separating device according to the present invention, and b) passing the mixture material through a least two liquid separation assemblies.

According to another aspect of the present invention, there is also provided a processing plant provided with the above-mentioned liquid separating device. The processing plant can be a farm, a factory, or any other type of establishment requiring the use of the present liquid separating device.

According to another aspect of the present invention, there is provided a method of operating the above-mentioned liquid separating device and/or plant.

According to another aspect of the present invention, there is also provided a kit with corresponding components for assembling the above-mentioned liquid separating device and/or plant.

According to another aspect of the present invention, there is also provided a set of components for interchanging with certain components of the above-mentioned kit.

According to another aspect of the present invention, there is also provided a method of assembling components of the above-mentioned kit and/or set.

According to another aspect of the present invention, there is also provided a method of manufacturing one or several of the above-mentioned components.

The objects and advantages of the present invention will become more apparent upon reading of the following non-restrictive description of preferred embodiments thereof, given for the purpose of exemplification only, with reference to the accompanying drawings.

While the invention will be described in conjunction with preferred embodiments given as way of mere examples, it is be understood that they are not intended to limit the scope of the present invention to such embodiments. On the contrary, it is intended to cover all possible alternatives, modifications and/or technical equivalents, with the present invention could be used and may be useful, as apparent to a person skilled in the art.

DETAILED DESCRIPTION OF PREFERRED EMBODIMENTS OF THE INVENTION

In the following description, the same numerical references refer to similar elements. The embodiments, geometrical configurations, materials mentioned and/or dimensions shown in the figures or described in the present description are preferred embodiments only, given for exemplification purposes only.

Moreover, although the present invention was primarily designed for use in the field of agriculture, farming and/or the like, for processing a mixture material typically containing at least some liquid material and at least some solid material, among other possible substances, such a manure and/or various other possible materials, the invention may be used with various other types of objects, and in various other fields, for applications where liquid material, or at the very least a substantially "liquid" material, would have to be separated from a compressible solid material, or at the very least from a substantially "non-liquid" material, as can be easily understood by a person skilled in the art. Hence, expressions such as "agriculture", "farming", "manure", "liquid", "solid", etc., as used in the present description, and/or any other reference and/or equivalent or similar expression to the latter should not be considered as limiting the scope of the present invention and include any other objects, substitutes, and/or any other applications with which the present invention may be used and may be useful, as can be easily understood by a person skilled in the art.

Moreover, in the context of the present description, expressions such as "separator", "liquid separating device", "system", "mechanism", "product", "device", "assembly", "roller", "cascade" and "dewaterer", as well as any other equivalent expressions and/or compounds word thereof known in the art will be used interchangeably, as apparent to a person skilled in the art. This applies also for any other mutually equivalent expressions, such as, for example: a) "processing", "treating", "handling", "extracting", "evacuating", "dewatering", "liquid separating", "wringing", "compressing" and "pressing"; b) "passage", "slot", "orifice", "groove", "conduit", "port" and "channel"; c) "material", "substance", "product", "manure", "matter" and "fibre"; d) "mixture", "composite" and "aggregate"; e) "allow", "force", "draw" and "urge"; f) "converging", "funnelling", "narrowing" and "folding"; g) "rail", "side", "edge", "rim" and "border"; h) "water", "liquid" and "fluid"; i) "inlet" and "entry"; j) "outlet" and "exit"; k) "stage", "assembly" and "section", etc.; as well as for any other mutually equivalent expressions, pertaining to the aforementioned expressions and/or to any other structural and/or functional aspects of the present invention, as also apparent to a person skilled in the art.

Furthermore, in the context of the present description, it will be considered that all elongated objects will have an implicit longitudinal axis, such as the pivot axis of a roller, for example, and that expressions such as "connected" and "connectable", or "mounted" and "mountable", may be interchangeable, in that the present invention also relates to a kit with corresponding components for assembling a resulting fully assembled liquid separating device.

In addition, although the preferred embodiments of the present invention as illustrated in the accompanying drawings comprise various components, and although the preferred embodiments of the liquid separating device and corresponding components of the present invention as shown consists of certain geometrical configurations as explained and illustrated herein, not all of these components and geometries are essential to the invention and thus should not be taken in their restrictive sense, i.e. should not be taken so as to limit the scope of the present invention. It is to be understood, as also apparent to a person skilled in the art, that other suitable components and cooperations thereinbetween, as well as other suitable geometrical configurations, may be used for the present liquid separating device and corresponding components thereof according to the present invention, as briefly explained herein and as can be easily inferred herefrom, without departing from the scope of the invention.

List of Numerical References of Some of the Corresponding Preferred Components Illustrated in the Accompanying Drawings 1. liquid separating device (also referred to simply as "separator")
3. mixture material
3a. solid material
3b. liquid material
5. support frame
7. liquid separation assembly
7a. first liquid separation assembly
107b. subsequent liquid separation assembly
9. upper wringing component
11. lower draining component
13. passage (defined between wringing and draining components)
13a. first passage
13b. subsequent passage
15. inlet (of passage 13)
17. outlet (of passage 13)

19. guiding assembly
21. height (of passage 13)
23. width (of passage 13)
25. solid roller
27. perforated roller (or simply "separation" roller)
27a. drainage holes
29. receptacle
31. guiding ramp
31a. first outer side rail (of guiding ramp 31)
31b. second outer side rail (of guiding ramp 31)
31c. intermediate rail (of guiding ramp 31)
33. feeding hopper
35. collector at inlet of the separation stage (accumulation trough)
37. perforated separation surface forming the roller
39. roller cleaning device ("scraper")
41. receptacle for recuperating the output at the end of the stage
43. recuperation receptacle of the liquids
45. guide device for correcting the distribution of the matter prior to the next stage
47. barrier for retention of the matter being redistributed
49. frame
51. moist matter to be treated
53. drop taken from the orifice by surface tension effect
55. liquid returning in the matter (remoistening)
57. matter having been remoistened
59. matter being dryer on the inside than at the surface Broadly described, the present invention, as exemplified in the accompanying drawings, relates to a liquid separating device (1) for processing a mixture material (3) containing both solid and liquid materials (3a,3b), in order to separate liquid material (3b) from the solid material (3a). The liquid separating device (1) comprises a support frame (5), a first liquid separation assembly (7a), at least one subsequent liquid separation assembly (7b), and at least one guiding assembly (19).

The first liquid separation assembly (7a) is mounted on the support frame (5), and comprises an upper wringing component (9) and a lower draining component (11), said components (9,11) being positioned with respect to another so as to define a first passage (13a) thereinbetween through which the mixture material (3) to be processed is channeled and pressed, in order to extract liquid material (3b) therefrom, the first passage (13a) having an inlet (15) for receiving the mixture material (3) to be processed and an outlet (17) for releasing processed material.

Each subsequent liquid separation assembly (7b) is mounted on the support frame (5), and also comprises an upper wringing component (9) and a lower draining component (11), said components (9,11) being positioned with respect to another so as to define a subsequent passage (13b) through which remaining mixture material to be processed is further channeled and pressed, in order to further extract liquid material therefrom, the subsequent passage (13b) having an inlet (15) for receiving material processed by a preceding liquid separation assembly (7a) and an outlet (17) for releasing further processed material.

Each guiding assembly (19) is mounted on the support frame (5) and is operatively disposed between each liquid separation assembly (7a,7b) for urging mixture material (3) released from a given liquid separation assembly (7) towards a subsequent liquid separation assembly (7b) so as to increase the effective thickness of the released mixture material (3) prior to entering the subsequent liquid separation assembly (7b).

Moreover, the liquid separation assemblies (7a,7b) are disposed about the support frame (5) in a cascading configuration, and the passage (13) of each liquid separation assembly (7) is narrower in width than the passage of a preceding liquid separation assembly (7) so that each subsequent liquid separation assembly (7b) is enabled to extract more liquid material via an increased wringing pressure resulting from a thickening of the remaining mixture material (3) to be processed and the narrower subsequent passage (13b) through which it is channeled and pressed.

This is particularly advantageous when used in an agricultural context, for treating liquid or semi-liquid manure, and/or other corresponding types of substances (black liquid, manure, etc.), for example, the main objective being the separation of the liquid material from the solid material. Hence, it is to be understood that the present invention may be used with a mixture material (3) where the initial state of the material to be treated may be variable, from very thick to very light (i.e. almost entirely liquid), and this matter to be treated may be generally composed of fecal matter, urine, water and litter in different forms (sand, vegetable fibers, sawdust, wood chips, etc.). There may also be the presence of milk and other substances resulting from other processes and/or activities taking place about the farm.

Various possible components and features of the present invention will be described in greater detail in reference to the accompanying drawings, and more particularly to FIGS. 5 and 6.

Indeed, each passage (13) of each liquid separation assembly (7) is preferably substantially rectangular, with a given height (21) and a given width (23). Preferably also, the height (21) of each passage (13) of each liquid separation assembly (7) is substantially the same, whereas the width (23) of each passage (13) of each liquid separation assembly (7) is substantially narrower than the passage (13) of a preceding liquid separation assembly (7). According to a preferred embodiment, the width (23) of each passage (13) of each liquid separation assembly (7) is about half the width (23) of the passage (13) of a preceding liquid separation assembly (7).

Alternatively, each upper wringing component (9) may be vertically displaceable about the support frame (5) so that the height (21) of each passage (13) of each liquid separation assembly (7) be selectively adjustable, and each wringing component (9) may be selectively operated at a variable speed. Similarly, each lower draining component (11) may be vertically displaceable about the support frame (5) so that the height (21) of each passage (13) of each liquid separation assembly (7) be further selectively adjustable, and each draining component (11) may be also selectively operated at a variable speed.

Figure 1:
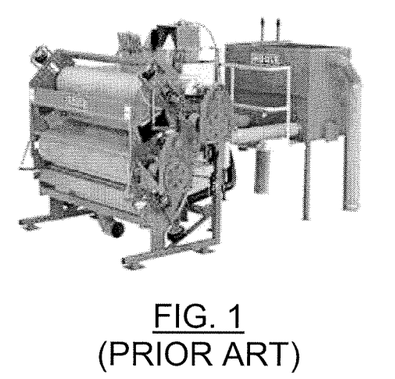
FIG. 1 is a perspective view of a separator according to the prior art.
Figure 2:
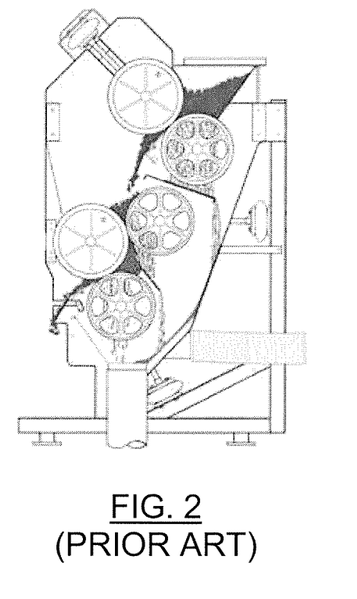
FIG. 2 is a schematic cross-sectional view of another separator according to the prior art.
Figure 3:
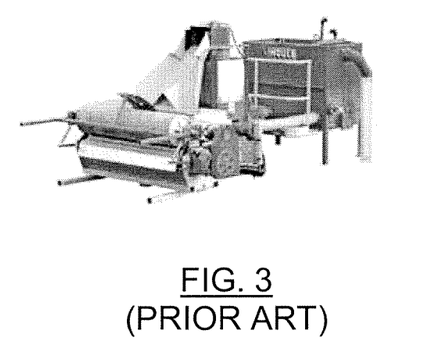
FIG. 3 is a perspective view of another separator according to the prior art.
Figure 4:
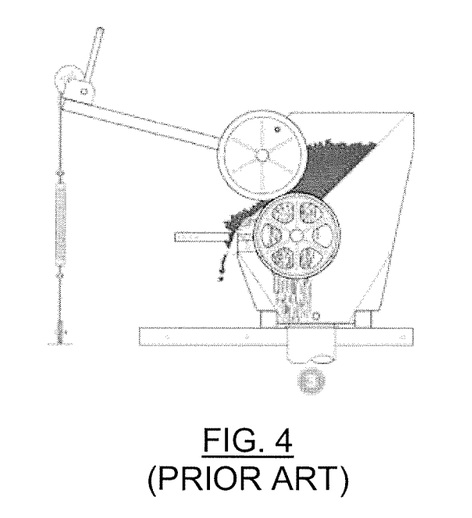
FIG. 4 is a schematic cross sectional view of another separator according to the prior art.
Figure 5:
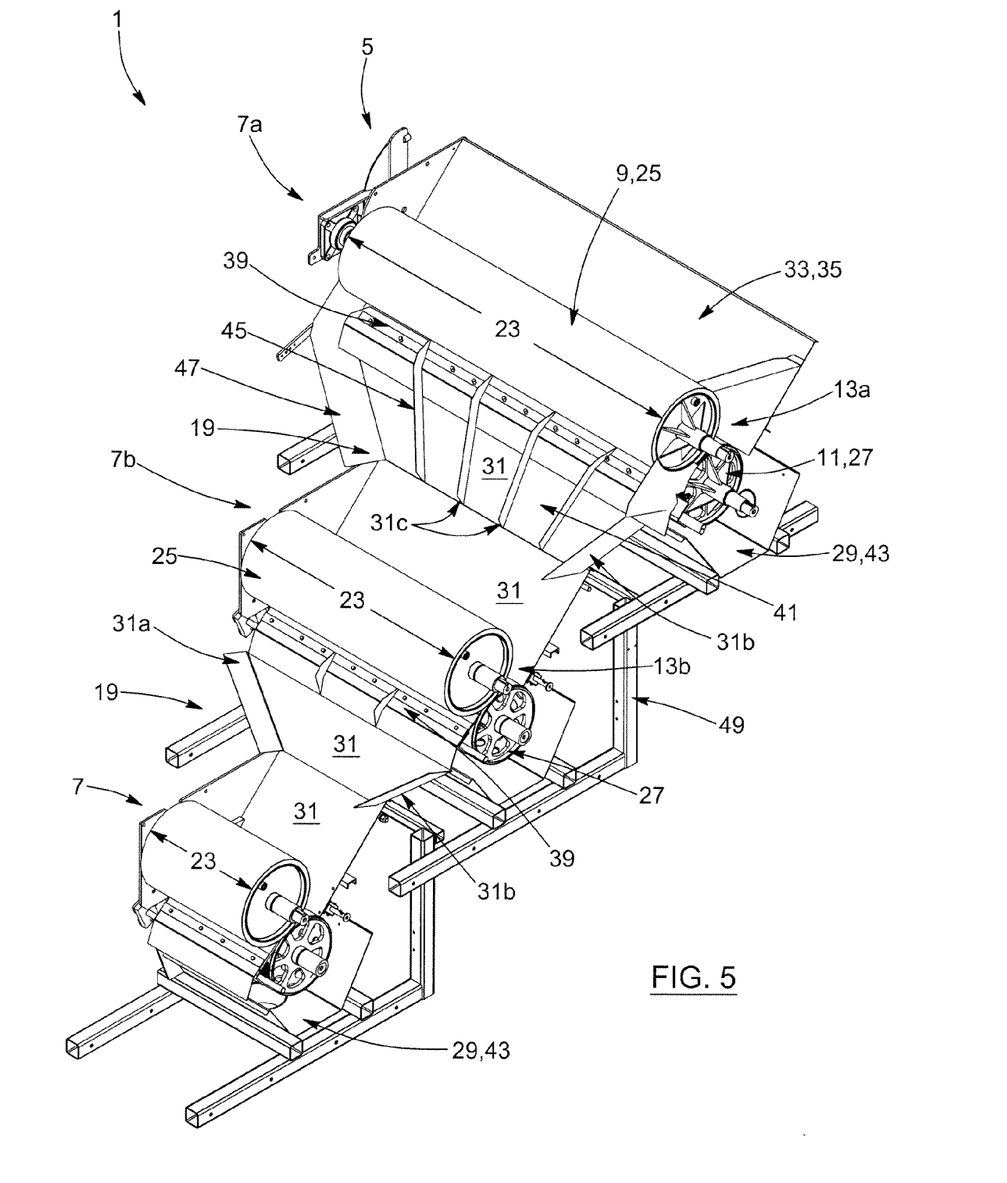
FIG. 5 is a perspective view of a liquid separating device according to a preferred embodiment of the present invention.
Figure 6:
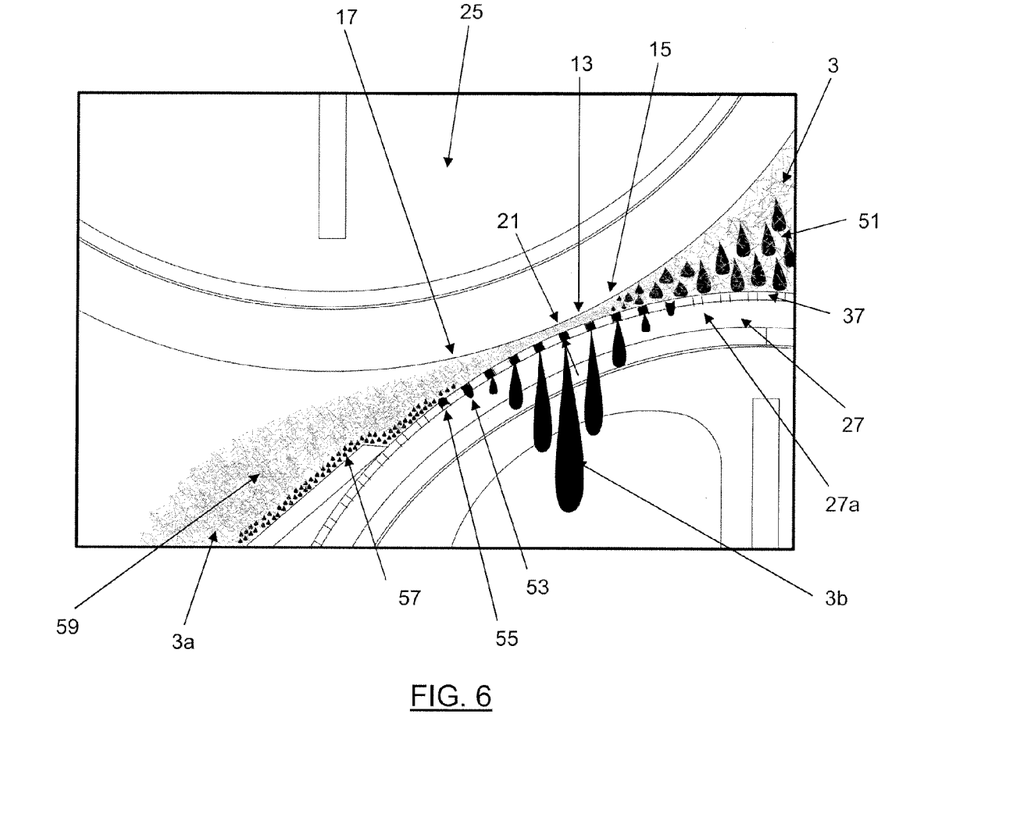
FIG. 6 is a cross-sectional view of some of the components of the liquid separating device shown in FIG. 5.

According to the embodiments shown in FIGS. 5 and 6, each wringing component (9) of each liquid separation assembly (7) is preferably a solid roller (25), whereas each draining component (11) of each liquid separation assembly (7) is a perforated roller (27) provided with corresponding peripheral drainage holes (27a), as better illustrated in FIG. 6. Preferably, each roller (25,27) of each liquid separation assembly (7) has a width (23) substantially equal to the width (23) of the passage (13) of its corresponding liquid separation assembly (7). Similarly to the aforementioned, each roller (25,27) can be selectively rotated at a variable speed. Preferably also, a receptacle (29) is provided under each perforated roller (27) for recuperating liquid material (3b) having been extracted by its corresponding liquid separation assembly (7).

Referring to the guiding assembly (19), and as better shown in FIG. 5, each one preferably comprises a funneling guiding ramp (31) operatively connecting a passage (13) of a given liquid separation assembly (7) to a passage (13) of a subsequent liquid separation assembly (7b). Preferably also, each guiding ramp (31) includes a pair of converging outer side rails (31a,31b), and may also include at least one intermediate rail (31c) positioned between the outer side rails (31a,31b) and converging with the same, as illustrated in the upper guiding ramp (31) of FIG. 5.

According to one aspect of the invention, the widths of the passages of consecutive pressing stages is increasingly narrower along the cascade, that is, each subsequent stage is of narrower width than the previous one. A guide is disposed between each consecutive pressing stage for guiding the solid matter and remaining liquid matter of the wet mixture therebetween. In the illustrated embodiment, the guide has a funnel shape having broader and narrower extremities matching the widths of the passages of the preceding and following pressing stages.

Advantageously, in such an embodiment, the guide receives the bed of matter outputted by the preceding pressing stage and guides the sides of this bed of matter so that it folds over itself, effectively increasing the thickness of the mixture as it enters the next pressing stage. This allows for a better distribution of the mixture as well as an increase in the pressure exerted thereon in the subsequent stage. Preferably, the height of the passages are substantially the same, so that by increasing the thickness of the bad of matter outputted by one pressing stage, the pressure applied through the next pressing stage is also increased. Also preferably, the width of the passage of each subsequent pressing stage is substantially half of the width of the passage of the preceding pressing stage, ensuring an even distribution of the bed of matter through the folding effect. For symmetry, the rollers of the various stages may be centrally aligned, so that both sides of the bed of matter would be evenly redistributed as if it was folded over like a blanket.

The present liquid separating device (1) may comprise a suitable number of liquid separation assemblies (7), whether two, three, four, etc., for providing the liquid separation device (1) with a corresponding multi-stage processing of the mixture material (3).

As also better shown in FIG. 5, the first liquid separation assembly (7a) is preferably operatively connected to a feeding hopper (33) for receiving the mixture material (3) to be processed by the liquid separating device (1), and according to a preferred embodiment of the present invention, the liquid separating device (1) is used for processing manure.

According to another aspect of the present invention, there is also provided a method of processing a mixture material (3) containing both solid and liquid materials (3a,3b), in order to separate liquid material (3b) from the solid material (3a), the method comprising the steps of a) providing a liquid separating device (1) such as the one briefly described herein and such as the one exemplified in the accompanying drawings; and b) passing the mixture material (3) through a least two liquid separation assemblies (7a,7b). According to another aspect of the present invention, there is also provided a kit with corresponding components for assembling the above-mentioned liquid separating device (1), and the present system may also include a set of components for interchanging with certain components of the above-mentioned kit.

Following will be a brief description of how the liquid separating device (1) and corresponding components work according to a preferred operational method of the present invention, as well as an overview of their various components and features, and resulting advantages.

Indeed, according to a preferred operational method of the present invention, at the inlet of a treatment stage, the matter is placed in the accumulation trough (35). The matter accumulated therein is pressed between the rollers, primary or secondary with preparation and the non-perforated counter rollers. Once the matter is pressed, it is taken back by the roller cleaning device (39). The matter is then channelled in the recuperation chute (41) at the outlet of the treatment stage. The bed of matter exiting is then manipulated and uniformly disposed by way of the distribution correction device (45, 47).

Several modifications may be brought to different elements or steps of the present invention. For example, different types of rollers may be used for the separation of the matter. Usually, the initial stages have rollers which allow the passing of a lot of liquid and are less structurally rigid since there is no or little pressure in the first stages, but rather extraction of a large quantity of liquid.

The different configurations depend on the type of matter to be treated, its thickness, and especially on the amount of matter to be treated as a function of the number of animals producing the matter to be treated.

At each of the stages, it may be possible to control, depending on the particular need, the speed of rotation of the rollers, the pressure between the rollers, the distribution of the matter, the accumulation of the matter in the inlet trough, etc.

The device which corrects the distribution of the matter at the inlet of a second stage may be any manipulation device. It may be an obstacle, a comb, a vibrating grid, a screw, etc., as apparent to a person skilled in the art.

The first stage (being the step of "dewatering") may be done by a pressed roller such as the one illustrated, but may also be made by any other separation equipment for high moisture rate. The first separation may thus be made by a screw separator, a sloped screen separator or any other equipment allowing liquid/solid separation, as also apparent to a person skilled in the art.

Referring now to the description of elements and/or possible optional steps according to the present invention, it is worth mentioning that the length of the rollers, their diameter as well as the shape and the distribution of the orifices on the rollers may vary. These variations answer to different applications where it may be necessary to treat a different amount or rate of matter, or even a matter of different thickness.

Though the concept of distribution of the matter and thickness of the material bed remains present, the separation at the initial stage may be any other type of roller press. Indeed, a vertical screw separator, a horizontal screen separator or even a perforation separator may be used.

Referring now to the conditions of cooperations which would not be operable according to the present invention, it is worth mentioning that the system of separation generating a non-uniform bed of matter inevitably results in a higher moisture level, which would thus not allow to obtain high drying levels. For the same reason, to have a thin bed of matter does not allow to obtain high drying levels of performance. Without these conditions, the system remains functional but less efficient, as can be easily understood.

As can now be better appreciated by a person skilled in the art in light of the present description, and the accompanying drawings, the present invention is substantially advantageous in comparison to other technologies known to the applicant, namely, for example to the versatility of configurations, the control of each of the treatment stages, in an independent manner.

The present invention is also advantageous in that it allows to dispose of matter favourably "in order to increase the drying level" prior to the passage of this matter to a next stage of compression in the roller press.

Other substantial advantages resulting from the present invention reside in that they allow increasing the thickness of the matter by diminishing the width of the next stage thus allowing to lessen the remoistening of the matter. Indeed, the present invention, comprises components and features for redistributing the matter in a uniform manner before the compression in order to get rid of areas where the roller cannot efficiently compress the fibre, thus significantly improving the drying level.

Not only is the remoistening considerably diminished, but it is then possible by this configuration to considerably reduce the manufacturing costs by allowing a design wherein the pressing elements (i.e. "rollers") are much more rigid, because they can be much shorter. It is thus possible by using a more rigid compression roller, to obtain higher performance levels of separation by eliminating the deflection of rollers, thus keeping the pressure uniform along the pressure line.

By repositioning the matter along the pressing line while combining the usage of a shorter roll, the open surface allowing evacuation of the water by the perforated roller is much less for a same amount of solid to separate. By reducing the number of openings of the screened roller, the remoistening effect is considerably reduced, thus allowing to obtain a higher level of drying.

It is thus possible, with the above-mentioned improvements according to the present invention, to bring the drying level up to about 37%. In addition to the high separation rate, the fibre is maintained in very good condition for using as litter. It is even possible to rapidly see the difference for a same separation rate by measuring the volume of accumulation of the solid matter produced by the prior art and to compare it with the result produced by the present system. The volume of fibre by compression under rollers is up to twice as voluminous, with these separation levels employed by systems of the prior art. A "screw" type separator breaks the fibre and the final result produces fibres which are too short and difficult to compress and less efficient when used as litter, having less absorption capacity. In contrast, the process according to embodiments of the present invention, keeps the fibre long and easy to compress and thus with more absorption capacity as litter.

With the above-described improvements according to the present invention, the energy required for efficient separation of the liquid manure is considerably reduced. Considerable energy savings are possible, which may provide up to 75% of reduction in electric consumption (30 HP for a screw separator to 7.5 HP for the process covered by the present invention. Moreover, these more than acceptable performances are possible without the presence of mechanical breakage and the separation results are much more constant. The present solution thus addresses the problems described in the prior art, be it for the existing roller system (weak performance) or even pressure screw systems (wear, deforming of the fibre, etc.).

As may now also be better appreciated, the present invention is also advantageous with respect to the prior art, in that according to a preferred embodiment of the present invention, the present liquid separating device provides a cascading roller assembly, each subsequent lower roller being smaller in length than a previous one, so that for a same given amount of material to be treated, the thickness of the material is increased from one stage to another, enabling to press more water out of the material entering the upcoming lower roller which receives this "thickened" mat of material to be pressed, as can be easily understood from FIG. 5 (indeed, there is a greater pressure of pressing from one roller to the next). Moreover, because each roller extremity is preferably shortened about ¼ from one stage to another, so that the thickness of the material mat to be treated is doubled from one stage to another, as can be easily understood from FIG. 5. Furthermore, the rollers of the cascading assembly are adjustable in speed to as to ensure that there is a continuous, thick and full amount of material under the entire length of each roller, thereby maximizing water extraction, as can be easily understood from FIG. 6.

Finally, and according to the present invention, the liquid separating drum (1), resulting separator (3) and corresponding components are preferably made of substantially rigid materials, such as metallic materials (stainless steel, etc.), hardened polymers, composite materials, and/or any other adequate material, while other components of the system according to the present invention, with the object of obtaining the resulting advantages briefly discussed hereinabove, may be made of any other appropriate material, such as polymer materials (plastic, rubber, etc.), and/or any other suitable material, depending on the particular applications and the environment for which the system is designed, and the different parameters in play, as can be easily understood by a person skilled in the art.

Although preferred embodiments of the present invention have been briefly described herein and illustrated in the accompanying drawings, it is to be understood that the invention is not limited to these embodiments and that various changes and modifications could be made without departing form the scope and spirit of the present invention, as defined in the appended claims.

The invention claimed is:

1. A liquid separating device for processing a mixture material containing both solid and liquid materials, in order to separate liquid material from the solid material the liquid separating device comprising:
   a support frame;
   at least two liquid separation assemblies disposed about the support frame in a cascading configuration, each of the separation assemblies being mounted on the support frame, each of the liquid separation assemblies comprising an upper wringing component and a lower draining component, said upper wringing component and lower draining components each being positioned with respect to another so as to define a first passage thereinbetween through which the mixture material to be processed is channeled and pressed, in order to extract liquid material therefrom, the passage having an inlet for receiving the mixture material to be processed and an outlet for releasing processed material, the passage of each subsequent assembly allowing to further extract liquid material, the passage of a subsequent assembly having an inlet for receiving material processed by a preceding one of the assemblies and an outlet for releasing further processed material, the passage of each liquid separation assembly being narrower in width than the passage of a preceding one of the assemblies so that each subsequent liquid separation assembly is enabled to extract more liquid material via an increased wring pressure resulting from a thickening of the remaining mixture material to be processed and the narrower subsequent passage through which it is channeled and pressed; and
   at least one guiding assembly mounted on the support frame and operatively disposed between each liquid separation assembly for urging mixture material released from a given liquid separation assembly towards a subsequent liquid separation assembly so as to increase the effective thickness of the released mixture material prior to entering the subsequent liquid separation assembly.

2. A liquid separating device according to claim 1, wherein each passage of each liquid separation assembly is substantially rectangular, with a given height and a given width.

3. A liquid separating device according to claim 1, wherein the height of each passage of each liquid separation assembly is substantially the same, whereas the width of each passage of each liquid separation assembly is substantially narrower than the passage of a preceding liquid separation assembly.

4. A liquid separating device according to claim 1, wherein the width of each passage of each liquid separation assembly is about half the width of the passage of a preceding liquid separation assembly.

5. A liquid separating device according to claim 1, wherein each upper wringing component is vertically displaceable about the support frame so that the height of each passage of each liquid separation assembly is selectively adjustable.

6. A liquid separating device according to claim 1, wherein each wringing component of each liquid separation assembly can be selectively operated at a variable speed.

7. A liquid separating device according to claim 1, wherein each wringing component of each liquid separation assembly is a solid roller.

8. A liquid separating device according to claim 1, wherein each lower draining component is vertically displaceable about the support frame so that the height of each passage of each liquid separation assembly is selectively adjustable.

9. A liquid separating device according to claim 1, wherein each draining component of each liquid separation assembly can be selectively operated at a variable speed.

10. A liquid separating device according to claim 1, wherein each draining component of each liquid separation assembly is a perforated roller provided with peripheral drainage holes.

11. A liquid separating device according to claim 10, wherein a receptacle is provided under each perforated roller for recuperating liquid material having been extracted by its corresponding liquid separation assembly.

12. A liquid separating device according to claim 7, wherein each roller can be selectively rotated at a variable speed.

13. A liquid separating device according to claim 7, wherein each roller of each liquid separation assembly has a width substantially equal to the width of the passage of its corresponding liquid separation assembly.

14. A liquid separating device according to claim 1, wherein each guiding assembly comprises a funneling guiding ramp operatively connecting a passage of a given liquid separation assembly to a passage of a subsequent liquid separation assembly.

15. A liquid separating device according to claim 14, wherein each guiding ramp includes a pair of converging outer side rails.

16. A liquid separating device according to claim 15, wherein each guiding ramp further includes at least one intermediate rail positioned between the outer side rails and converging with the same.

17. A liquid separating device according to claim 1, wherein the liquid separating device comprises a total of two liquid separation assemblies for providing the liquid separation device with a two-stage processing of the mixture material.

18. A liquid separating device according to claim 1, wherein the liquid separating device comprises a total of three liquid separation assemblies for providing the liquid separation device with a three-stage processing of the mixture material.

19. A liquid separating device according to claim 1, wherein the first liquid separation assembly is operatively connected to a feeding hopper for receiving the mixture material to be processed by the liquid separating device.

20. A liquid separating device according to claim 1, wherein the liquid separating device is used for processing manure.

21. A kit with components for assembling a liquid separating device according to claim 1.

22. A method of processing a mixture material containing both solid and liquid materials, in order to separate liquid material from the solid material, the method comprising the steps of:
   a) providing a liquid separating device according to claim 1; and
   b) passing the mixture material through at least two liquid separation assemblies.

23. A method of processing a mixture material containing both solid and liquid materials, in order to separate liquid material from the solid material, the method comprising the steps of:
   a) pressing the mixture material through a first given passage and extracting liquid material therefrom via a draining component in a first stage; and
   b) funneling remaining mixture material released from the first stage in order to have an increased effective thickness of the remaining mixture material and pressing the thickened remaining mixture material through a subsequent passage narrower than the preceding one so as to further extract liquid material therefrom via another draining component in at least one other stage.

* * * * *